Oct. 8, 1929.  R. H. LANGLEY  1,731,141
INDICATING DEVICE
Filed Oct. 23, 1926  2 Sheets-Sheet 1
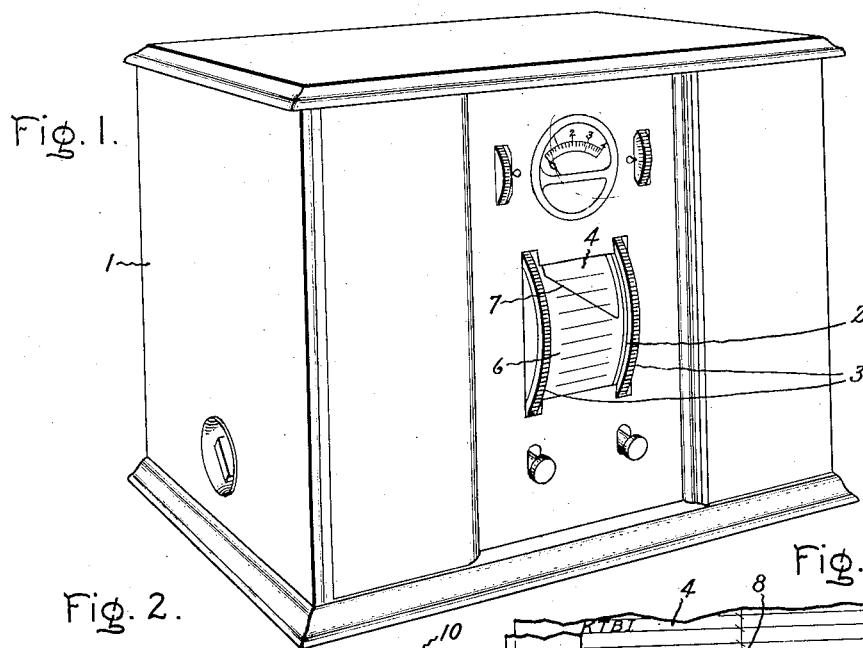
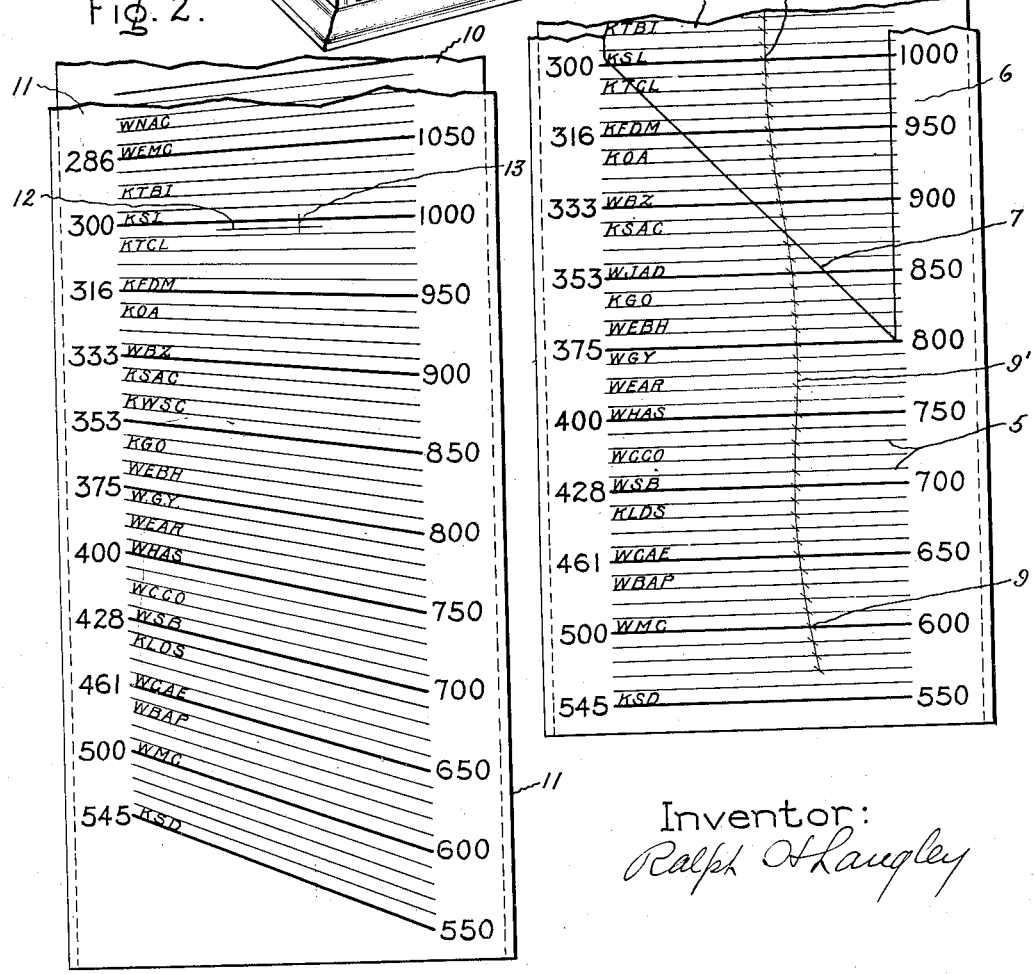
Inventor:
Ralph H Langley Oct. 8, 1929.   R. H. LANGLEY   1,731,141
INDICATING DEVICE
Filed Oct. 23, 1926   2 Sheets-Sheet 2
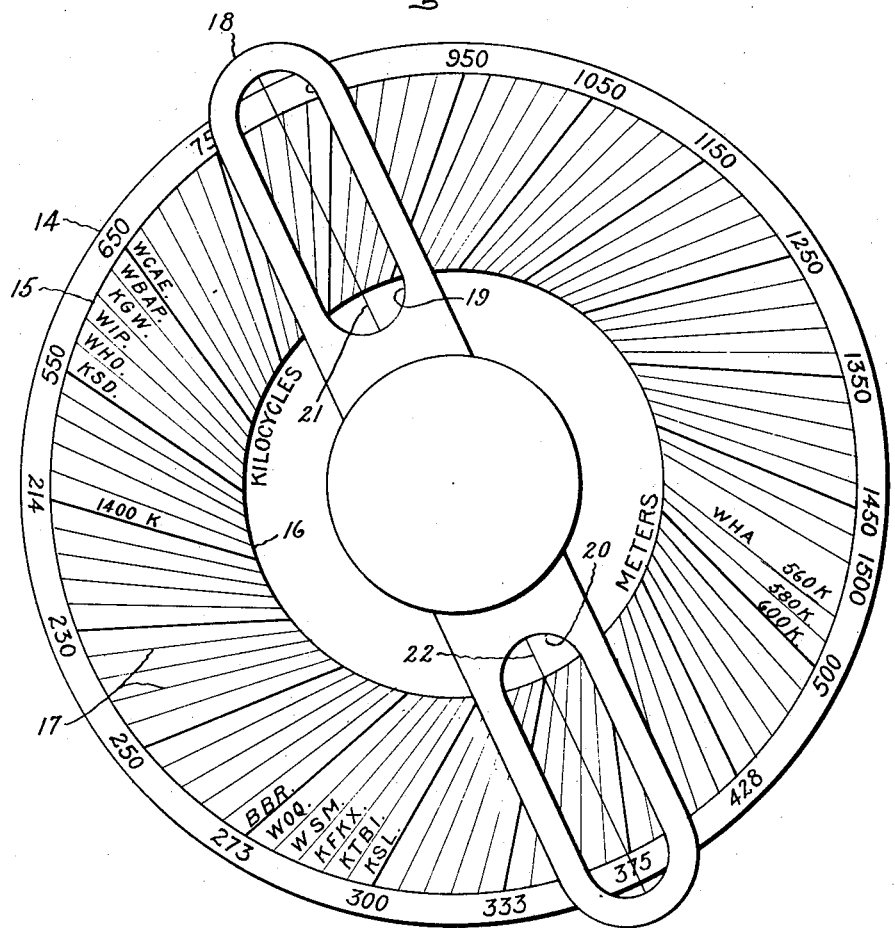
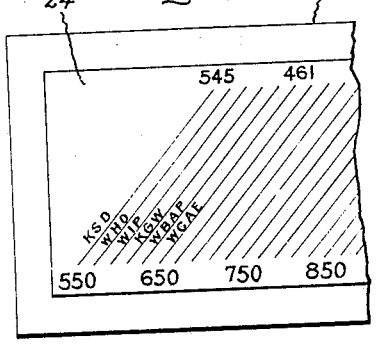
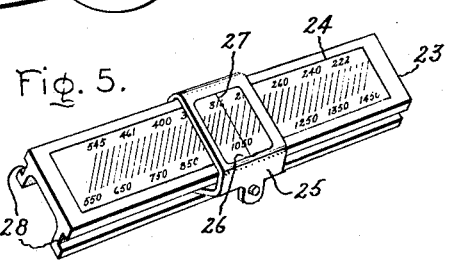
Inventor:
Ralph H Langley Patented Oct. 8, 1929

1,731,141

UNITED STATES PATENT OFFICE

RALPH H. LANGLEY, OF SCHENECTADY, NEW YORK, ASSIGNOR TO GENERAL ELECTRIC COMPANY, A CORPORATION OF NEW YORK

INDICATING DEVICE

Application filed October 23, 1926. Serial No. 143,762.

My present invention relates to indicating devices suitable for use in connection with signal receiving apparatus, and more particularly to devices which are especially adapted for use in connection with apparatus intended for the reception of broadcast radio signals.

Because of differences in manufacture and assembly of variable condensers and inductance coils, it is practically impossible to provide a scale which will indicate accurately for all such units an electrical characteristic of a received signal, such as wave length or frequency. For example, the capacity of any given tuning condenser in a receiver may be relatively low as a result of which it will have to be moved through a relatively large angle to cover a given frequency range, while the capacity of another condenser may be relatively high and it will have to be moved through a relatively smaller angle to cover the same frequency range. The latter condenser would, therefore, require a shorter frequency scale than the former condenser.

It is one of the objects of my invention to provide means whereby the operator of the receiver set is enabled to accurately adjust the set at will for the reception of signals of any desired frequency within the operating range of the set.

The novel features which I believe to be characteristic of my invention are set forth with particularity in the appended claims. The invention itself, however, will best be understood from reference to the following specification taken in connection with the accompanying drawings in which Fig. 1 shows a perspective view of a radio receiving set which embodies the features of my invention; Fig. 2 is a view partly broken away of a modified form of my invention; Fig. 3 is a view partly broken away of the index and scale employed in Fig. 1; Figs. 4 and 5 show further modified forms of my invention; while Fig. 6 is an enlarged plan view partly broken away of the scale and support shown in Fig. 5.

Referring more particularly to Figs. 1 and 3, I have indicated at 1 a radio receiving cabinet having mounted therein a tuning device, not shown, which may be controlled by means of a rotary drum 2 which extends through a window opening in the front panel of the cabinet and is provided with a pair of operating wheels 3. A cardboard strip or scale 4 is mounted on the drum and may be retained thereon in any suitable manner. Strip 4 is provided with a series of parallel horizontal indicating lines 5 spaced apart a suitable distance to indicate the characteristics of received signals, such as frequency in kilo cycles. These frequencies may be printed at one end of the horizontal lines, while at the opposite ends of the lines, the wave lengths corresponding to the various frequencies may be indicated. If desired the call letters of any station or any series of stations having the frequency or wave lengths indicated by a horizontal line may be written on that line, the strip 4 being normally about two inches in width which width is sufficient to provide room for the call letters for several stations. In order to provide sufficient space between lines the drive mechanism for the tuning element may be arranged so that the drum 2 will turn through 360° while the tuning element turns through 180°.

Cooperating with the strip or scale 4 is a celluloid or similar transparent strip 6, secured in position in the window opening of the cabinet 1 and above and substantially parallel to the surface of drum 2. The strip 6 has a width substantially equal to the length of the horizontal lines 5 and is provided with a triangular opening the lower edge of which serves as a fixed indicating line 7 which constitutes an index member. Line 7 extends obliquely across the window opening and scale and is relatively adjustable with respect to the scale or dial so that it may intersect each horizontal scale line at substantially every point in the length of such lines. Scale 4 may be readily divided so as to indicate the amount of movement of the tuning member of the receiver ordinarily necessary to provide definite frequency changes. In adjusting the tuning device, drum 2 is moved until a signal of a given length, such as 1000 kilo cycles is received. The point at which the line or index 7 intersects the 1000 kilo cycle line is indicated by a short line 8. The drum 2 may then be moved to receive a signal of another frequency as, for example, 600 kilo cycles, and the point at which the line 7 intersects the 600 kilo cycle line may be indicated by another line as at 9. The points at which line 7 intersects the various other horizontal lines may be indicated in a similar manner. In this way the operator can accurately determine and record the exact position of the adjustable member necessary to receive a signal of a given frequency or wave length and a calibration curve 9' may be drawn on the scale member 4.

If the relation of the amount of movement of the tuning member to the frequency were always a straight line characteristic, the points at which the diagonal line 7 intersects the horizontal lines of the scale 4 would form a straight line. The characteristic of the tuning elements are not always exactly straight line characteristics, however, and the intersections of the diagonal line 7 with the horizontal lines of the scale will, therefore, form a line which as a rule will be slightly wavy. It is immaterial, however, what is the characteristic of the tuning element in the present arrangement, since the operator is able to accurately calibrate the receiver irrespective of the characteristic of the particular tuning device.

In Fig. 2 I have shown a modification of my invention. In this figure, I have indicated at 10 a paper strip or scale provided with indications on opposite edges thereof as on strip 4. The vertical length of the scale at the right hand edge of the strip corresponds to the longest frequency scale which will ever be required for any coil and condenser, while the vertical length of the scale at the left hand edge corresponds to the shortest frequency scale which will ever be required. In this arrangement the 1000 kilo cycle line may be made a horizontal line and the set will be initially adjusted to this frequency. Scale 10 may be mounted on the drum 2. When a scale of this type is employed, however, the celluloid window or strip 11, provided above the scale, is not cut away diagonally as in Figs. 1 and 3 but covers the entire visible portion of the scale. In order to provide a proper index for the set, when such a scale is used, the set is initially adjusted to 1000 kilo cycles and a horizontal index line 12 is drawn on the celluloid window parallel to and coincident with the 1000 kilo cycle line. The horizontal line on the celluloid window is an accurate calibration for this particular frequency. The set is then adjusted to a second frequency, as for example 1450 kilo cycles, and a short vertical line 13 is drawn on the celluloid across the previous horizontal line at the point where the horizontal line on the celluloid intersects the 1450 kilo cycle line. The point on the celluloid window at which the vertical line intersects the horizontal line provides a reference point on this index line and determines the setting of the tuning device for any given frequency or wave length. The frequency characteristics of the tuning condenser may be made to be a straight or nearly straight line. Since the above calibration locates two points on the line it locates all points on the line. If the frequency characteristic of the tuning condenser varies considerably from a straight line the spacing of the scale lines may be varied to compensate for the departure from the straight line characteristic. The scale and celluloid cover shown in Fig. 2 may be substituted bodily for the scale and celluloid window shown in Figs. 1 and 3. In the arrangement shown in Figs. 1 and 3, however, the calibration is done by the operator, whereas with an arrangement such as shown in Fig. 2 the calibration is accomplished at the factory.

I have shown in Fig. 4 a further modification of my invention for use in simpler forms of radio receivers. In this figure a circular or annular member or dial 14 is provided with a circle 15 which may be divided into substantially equal part, the lines corresponding to alternate frequencies in the upper and lower halves of the scale, that is, the lines for frequencies 550, 570, 590, 610, etc., are shown in the upper half, and the lines for 560, 580, 600, 620, etc., are shown in the lower half. This is done because the usual tuning condensers have only 180° of rotation, whereas by arranging the dial in this manner and using a double ended pointer or indicator, the full 360° of the dial may be utilized. Obviously, the entire scale could be included in the first 180° and a single ended indicator used. In the dial shown, the frequencies may be indicated around the upper half, and the corresponding wave lengths around the lower half.

A circle 16 concentric with circle 15 is drawn on member 14. Lines 17 are then drawn from the outer circle 15 to circle 16 so that they are tangent to a concentric circle which may be inscribed within circle 16. The lines between circles 15 and 16 provide a scale or dial on which the call letters of various stations may be inscribed. A movable arm 18 attached in any suitable manner to the tuning element of the receiver is provided with opposite extensions having cut away portions 19 and 20, respectively, providing window openings, within which are mounted threads or hair lines 21 and 22 providing a pair of straight indicating lines or indices cooperating with the scale. The calibration of the scale shown in Fig. 4 may be accomplished in the same manner as the calibration of the scale shown in Figs. 1 and 3, that is, the arm 18 would be adjusted until a signal having a certain frequency, say 1000 kilo cycles, would be received. A line would then be drawn on the 1000 kilo cycle line at the point of intersection with the line on arm 18. Arm 18 would then be adjusted to another frequency such as 600 kilo cycles and then again a line would be drawn on the 600 kilo cycle line at the point of intersection with the line on arm 18. In this manner the entire scale could be calibrated by the operator for all frequencies and wave lengths which were within the operating range of the set. Although I have indicated that the arm 18 is movable and the scale member fixed in position, obviously this arrangement could be reversed if desired and the arm 18 made the fixed member and the scale or dial the movable member.

In the modification of my invention shown in Figs. 5 and 6, I have provided a stationary flat base 23 to which a scale 24 may be secured. The indicating scale lines are arranged diagonally on the scale and are substantially parallel to one another. These lines may indicate wave lengths, frequencies and the call letters of transmitting stations as in the other figures of the drawing. A movable member 25, provided with a window opening 26 and a hair line 27, which is perpendicular to the edge of the scale 24, is adapted to slide in guide ways 28 provided on the base 23. The movable member 25 may be connected to the tuning member of the receiving set through any suitable form of gearing or pulleys so as to be made movable with the tuning element. In this modification the calibration is effected in the same manner as in the devices shown in Figs. 1, 3 and 4, that is, the hair line 27 is adjusted to 1000 kilo cycles and the point of intersection of the line 27 with the thousand kilo cycle line indicated. The line 27 is then moved to receive signals of other frequencies and the points of intersection of line 27 with the lines indicating these frequencies is marked and a calibration curve drawn through the various points of intersection.

What I claim as new and desire to secure by Letters Patent of the United States, is:

1. An indicating device for a signal receiving apparatus comprising a relatively movable scale member having spaced lines thereon and an index member, said index member comprising an indicating line arranged to intersect a plurality of said spaced lines.

2. A signal receiving apparatus comprising a scale member and a cooperating index member, one of said members being movable, said scale having spaced lines thereon, said index comprising an indicating line extending at least partially across said scale and adapted to simultaneously intersect a plurality of said spaced lines.

3. A signal apparatus comprising a scale member and a cooperating index member, one of said members being movable, said scale member having a series of spaced lines thereon, said index comprising an indicating line adapted to intersect each of said spaced lines at substantially every point on said lines.

4. A signal receiving apparatus comprising a scale member and a cooperating index member, one of said members being movable, said scale having spaced lines thereon adapted to indicate an electrical characteristic of a received signal, said index comprising an indicating line extending at least partially across said scale and arranged to intersect said spaced lines, a point of intersection of said indicating line with any one of said spaced lines providing an accurate indication of the position of the receiving apparatus necessary to receive signals having the characteristics indicated by the intersected line.

5. A signal receiving apparatus comprising a scale member having a series of lines spaced apart thereon, each of said lines indicating a certain characteristic of a signal to be received, and a cooperating index member, one of said members being movable, said index member being positioned above said scale member and having an indicating line adapted to intersect each of said spaced lines at a plurality of points, whereby a point on a spaced line, corresponding to an adjustment of the receiver necessary to receive signals of said certain characteristic, may be determined.

6. A signal receiving apparatus comprising a scale member having spaced lines thereon and a cooperating index member positioned above the scale member, said scale member and index being relatively adjustable and so constructed and arranged that said index member may intersect each of the lines of said scale at a plurality of points on said lines.

7. A signal receiving apparatus comprising a scale member and a cooperating index member, said scale having spaced lines thereon, each of said lines indicating the frequency, wave length, and call letters of a transmitting station, said members being adjustable relative to one another, said index being arranged obliquely to the indicating lines of said scale whereby a point of intersection may be located on each line of the scale at which signals corresponding to the frequency and wave length indicated on that line may be received.

8. A signal receiving apparatus comprising a stationary scale member, a movable indicating line extending at least partially across said scale member, said scale member being marked with indicating lines oblique to the movable line.

9. A signal receiving apparatus comprising a stationary scale member, a movable member provided with an opening, an indicating line mounted in said opening and extending across said scale, said scale being marked with indicating lines oblique to the movable line and intersecting the latter when viewed through said opening.

10. A signal receiving apparatus comprising an annular scale member having spaced lines thereon indicating frequencies or wave lengths of signals to be received, an index member simultaneously cooperating with opposite portions of the annular scale member, one of said members being movable, the lines on one portion of the scale indicating frequencies or wave lengths intermediate the frequencies or wave lengths indicated by successive lines on opposite portions of the scale.

11. A signal receiving apparatus comprising a scale member having spaced lines with the call letters of transmitting stations indicated on said lines, an index member cooperating with the scale member and having an indicating line oblique to the lines on the scale member, said scale member and index member being relatively movable.

12. In a visual indicator for radio receiving sets, the combination of a panel having a window opening, a fixed indicating line extending across said opening, and a dial member having a surface movable past said opening, said surface being marked with scale lines oblique to said fixed indicating line and intersecting the latter when viewed through said opening.

13. In a visual indicator for radio receiving sets, the combination of a panel having a window opening, a fixed indicating line extending across said opening, and a dial member having a surface movable past said opening, said surface being marked with scale lines oblique to said fixed indicating line and intersecting the latter when viewed through said opening, and a calibration curve drawn through the several points of intersection of said scale lines with said indicating line which correspond to accurate tuning.

In witness whereof, I have hereunto set my hand this 21st day of October, 1926.

RALPH H. LANGLEY.